United States Patent [19]
Donovan et al.

[11] Patent Number: 5,785,348
[45] Date of Patent: Jul. 28, 1998

[54] DIFFUSOR CUP FOR AN INFLATOR DEVICE WHICH IS USED TO INFLATE AN AIRBAG IN AN AIRBAG SYSTEM

[75] Inventors: Steven P. Donovan, Roscoe; David C. Goss, Rockford, both of Ill.

[73] Assignee: Textron Inc., Providence, R.I.

[21] Appl. No.: 852,965

[22] Filed: May 8, 1997

Related U.S. Application Data

[63] Continuation of Ser. No. 806,917, Feb. 26, 1997, abandoned.

[51] Int. Cl.$^6$ .................................................... B60R 21/28
[52] U.S. Cl. ........................ 280/740; 280/736; 280/728.2; 280/732
[58] Field of Search ............................ 280/740, 736, 280/728.2, 732, 728.1, 737, 741

[56] References Cited

U.S. PATENT DOCUMENTS

| | | | |
|---|---|---|---|
| 3,817,263 | 6/1974 | Bendler et al. | 280/736 X |
| 3,877,721 | 4/1975 | Brown, Jr. | 280/736 |
| 4,013,305 | 3/1977 | Ichihara | 280/740 X |
| 5,615,912 | 4/1997 | O'Loughlin et al. | 280/737 |
| 5,660,412 | 8/1997 | Renfroe et al. | 280/737 |

*Primary Examiner*—Christopher P. Ellis
*Attorney, Agent, or Firm*—Trexler, Bushnell, Giangiorgi & Blackstone, Ltd.

[57] ABSTRACT

A novel diffusor cup forms part of an inflator device which is used to inflate an airbag. The novel structure of the diffusor cup substantially reduces the deflection thereof during deployment of the airbag. This improves the consistency and reliability of inflating the airbag with a proper volume of gas. The diffusor cup is attached to a bottle which houses a pressurized gas and the bottle and diffusor cup are mounted within a housing module. The diffusor cup is formed from a first wall which bears against an end plate of the housing module, a second wall which depends from the first wall and joins with the bottle, and a third wall which depends from the opposite end of the first wall. The second wall is formed from a truncated cone such that it tapers from the first wall to the bottle. A stud is mounted within the diffusor cup walls and is mechanically secured thereto by a plurality of graduated steps formed on the stud and by a back shear. A threaded portion of the stud secures the diffusor cup to the end plate by a nut. When internal pressures from expansion of the gas as the airbag is deployed are applied to the stud, the stud transfers the load formed by the pressures to the second wall, thereby preventing substantial deflection or distortion of the diffusor cup.

18 Claims, 6 Drawing Sheets

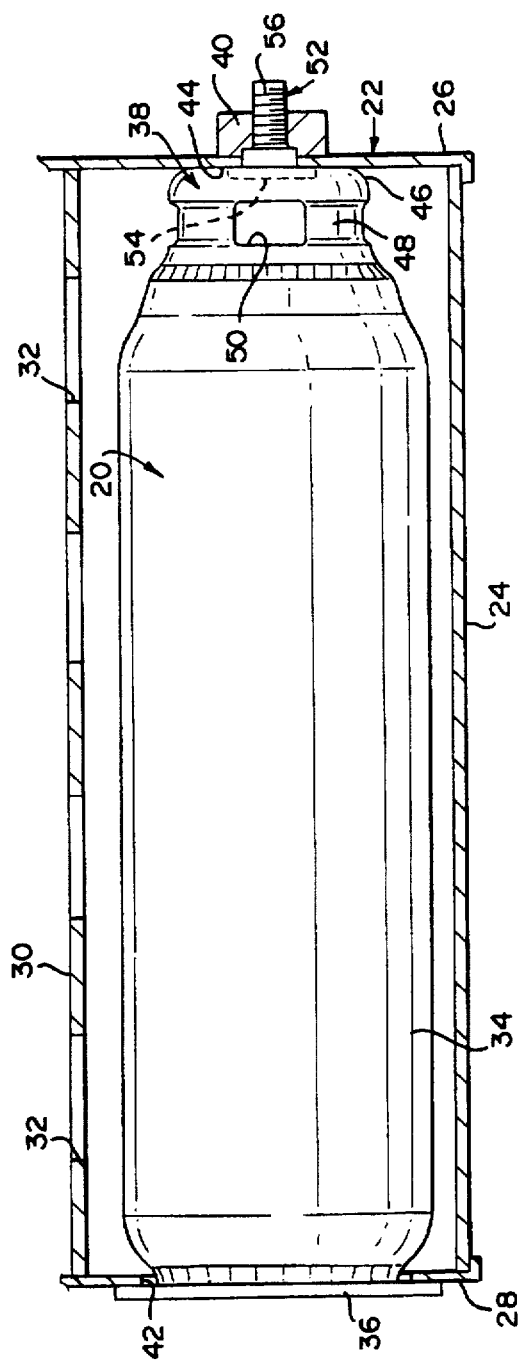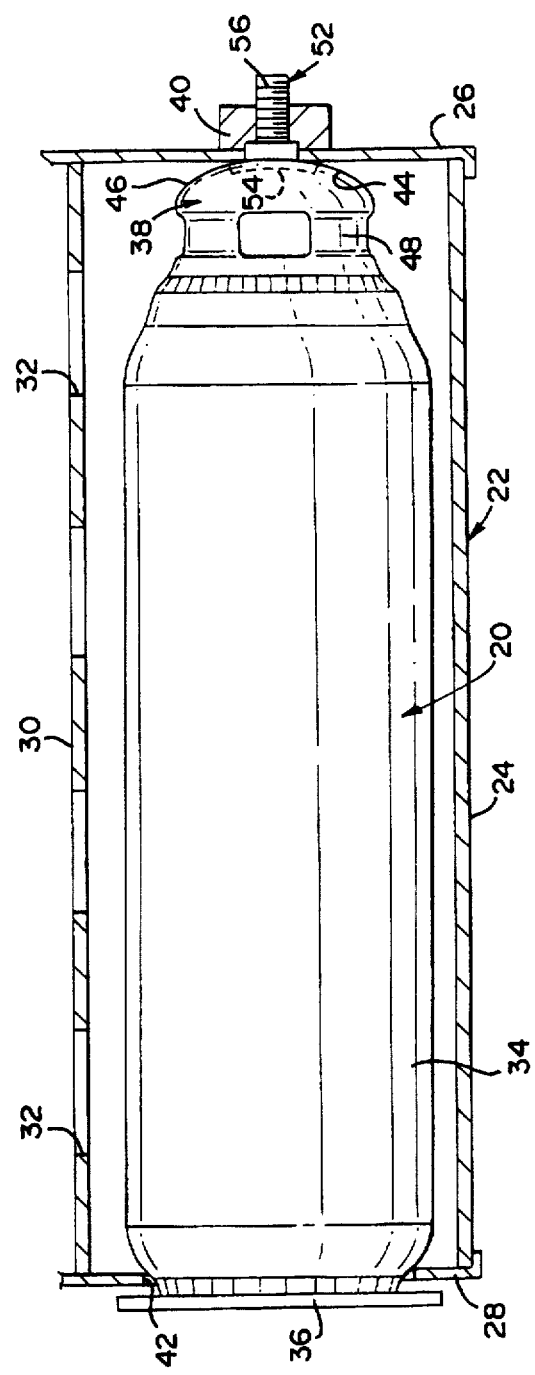

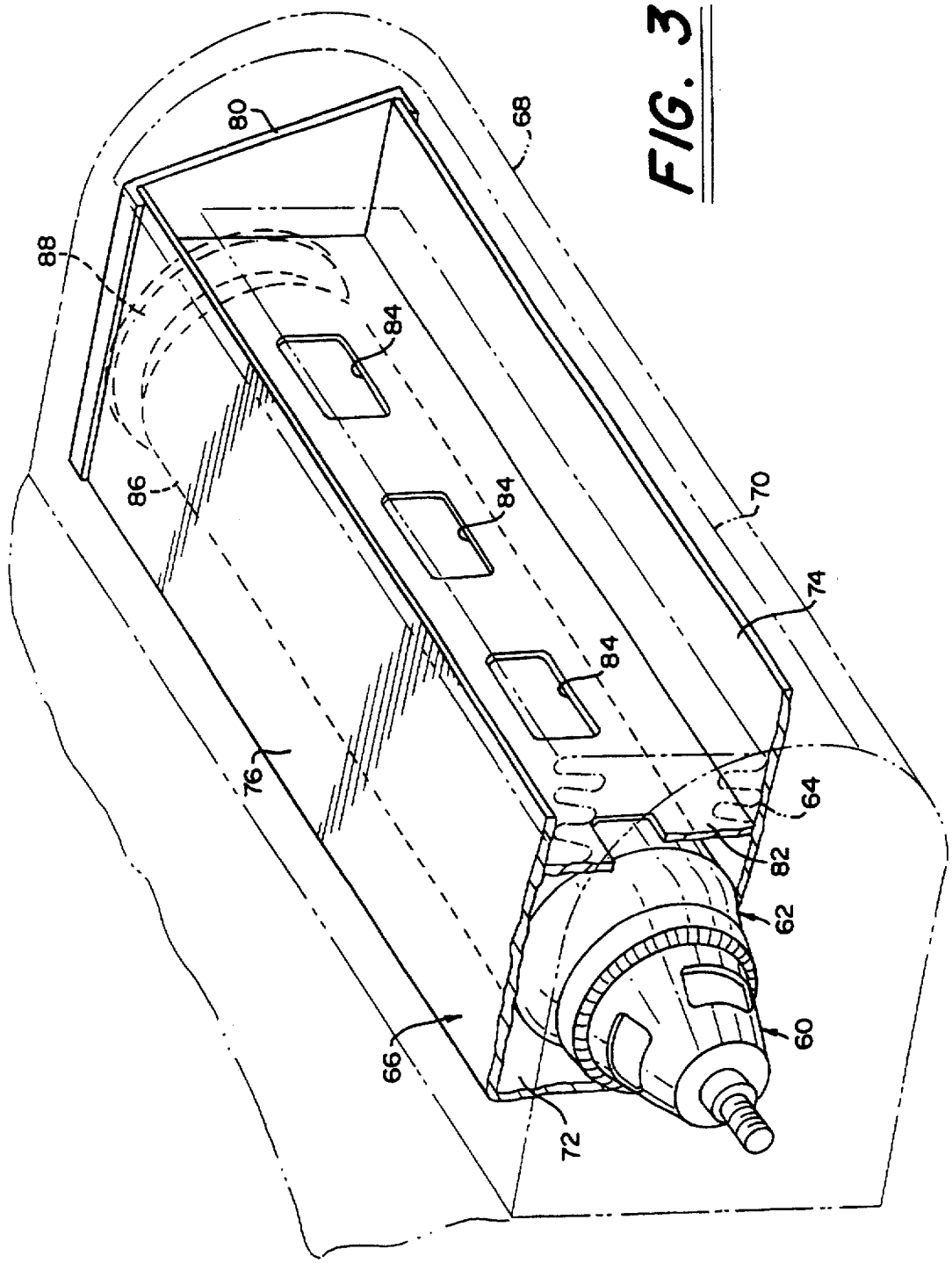

DIFFUSOR CUP FOR AN INFLATOR DEVICE WHICH IS USED TO INFLATE AN AIRBAG IN AN AIRBAG SYSTEM

This is a continuing patent application of Ser. No. 08/806,917, filed on Feb. 26, 1997, entitled "A Diffusor Cup For An Inflator Device Which Is Used To Inflate An Airbag In An Airbag System", now abandoned.

BACKGROUND OF THE INVENTION

The present invention is generally directed to a diffusor cup which forms part of a hybrid or fluid fuel inflator device for use in inflating an airbag in a vehicle airbag restraint system. More specifically, the present invention presents a novel airbag diffusor cup for an inflator which substantially reduces the deflection of the diffusor cup during deployment of an airbag. This improves the consistency and reliability of inflating the airbag with a proper volume of gas, and prevents leakage. Hybrid and fluid fuel inflator devices were developed to overcome the difficulties associated with handling sensitive pyrotechnic materials, such as sodium azide.

A prior art hybrid or fluid fuel inflator device 20 for an airbag system is shown in FIGS. 1 and 2. The typical airbag system includes several crash detectors, i.e. accelerometers, a crash algorithm, a diagnostic circuit for monitoring system readiness, backup power electronics, a gas generator, the inflator device 20, and a nylon airbag. The inflator device 20 is enclosed within a housing module 22 and the airbag (not shown) is attached thereto.

The housing module 22 includes a back wall 24 and a pair of side walls which extend from the opposite side edges of the back wall 24 and are perpendicular thereto. A pair of end plates 26, 28 are attached to the opposite ends of the back wall 24 and the side walls. A diffusor housing 30 is attached between the side walls and the end plates 26, 28. The diffusor housing 30 has a plurality of exhaust ports 32 provided therethrough.

The nylon airbag is attached to the diffusor housing 30 by suitable means such that it is in fluid communication with the interior of the housing module 22, via diffusor housing 30, ports 32 and the diffusor cup 38 and the exhaust ports 50 therein. When the airbag is in an undeployed condition, it is folded up and stored behind the steering wheel cover or the dashboard cover.

The inflator device 20 includes a bottle 34 which is formed from a cylindrical wall having an end plug 36 welded to one end thereof. The opposite end of the bottle 34 has a diffusor cup 38 provided thereon. The diffusor cup 38 is attached to one end plate 26 of the housing module 22 by suitable means, such as a nut 40. The end of the bottle 34 opposite to that of the diffusor cup 38 extends through an aperture 42 provided through the end plate 28 and when the airbag is not inflated, the end plug 36 sits snugly against the outer surface of the end plate 28 as shown in FIG. 1. A small amount of a pyrotechnic material and a pressurized gas are stored in the bottle 34 and are activated when necessary to inflate the airbag.

As shown in FIG. 1, prior to release of the pressurized gas from within the inflator device 20 and inflation of the airbag, the prior art diffusor cup design 38 has a flat end wall 44 which abuts against the inner surface of the end plate 26. The end wall 44 has an outer profile which is generally circular. A generally rounded wall 46 extends radially outwardly from the flat end wall 44 three hundred and sixty degrees therearound. A generally flat wall 48 extends from the opposite end of the rounded wall 46 and is perpendicular to the flat end wall 44. The flat wall 46 forms a cylinder. A plurality of exhaust ports 50 are provided through the flat wall 48 which allows the pressurized gas to be released from the bottle 34 and into the airbag so as to inflate the airbag during deployment.

A stud 52 is provided for securing the diffusor cup 38 to the end plate 26. The stud 52 is formed from a flat plate 54 that has a threaded portion 54 extending perpendicularly therefrom. The threaded portion 54 is inserted through an aperture provided through the flat end wall 44 and the flat plate 54 is welded to the interior of the flat end wall 44. The threaded portion 56 further extends through an aperture provided through the end plate 26 and is secured thereto by the nut 40.

During deployment, the crash detectors send an electrical signal to the diagnostic circuit which, in turn, sends a signal to the inflator device 20. The inflator device 20 then ignites the pyrotechnic material and releases the stored gas within the bottle 34 thereby inflating the airbag. The flow rate of the gas is controlled by the exhaust ports 32, 50 in the diffusor cup 38 and in the diffusor housing 30.

During deployment of the airbag in a typical airbag system, excessive deflection of the diffusor cup 38 can occur as a result of the internal pressures from expansion of the gas as shown in FIG. 2. When the internal pressures caused by the expansion of the gas are applied to the stud 52, the load formed by the pressures is transferred to the flat end wall 44 of the diffusor cup 38 which bears against the interior of the end plate 26, thereby causing the end wall 44 and the stud plate 54 to deflect and become rounded. This results in the elongation of the length of the diffusor cup 38 and therefore, the elongation of the inflator device 20 within the housing module 22. As the one end of the inflator device 20 is secured to the end plate 26 by the nut 40, the inflator device elongates such that the end plug 36 attached to the bottle 34 moves away from the end plate 28 as shown in FIG. 2. This causes a leak point around the end of the bottle 34 because of the gap formed between the end plug 36 and the end plate 28. Therefore, as the gas is escaping from the inflator device 20, some of the gas leaks out from the housing module 22 through this gap. This leakage causes insufficient volume to properly and reliably inflate the airbag. In addition, it has been found that the weld between the stud 52 and the flat end wall 44 of the diffusor cup 38 can fail during deployment of the airbag and that this welded connection can degrade the mechanical properties of the stud 52.

The present invention provides a novel diffusor cup which overcomes the disadvantages presented by the prior art as well as to provide several additional advantages as will become apparent upon a reading of the attached specification.

OBJECTS AND SUMMARY OF THE INVENTION

A general object of the present invention is to provide a novel diffusor cup for a hybrid or fluid fuel inflator device for use in inflating an airbag in a vehicle airbag system.

Another general object of the present invention is to provide a novel structure for a diffusor cup inflator device which substantially reduces the deflection of the diffusor cup during deployment of an airbag.

An object of the present invention is to provide a novel inflator device which has improved consistency and reliability than prior art inflator devices for inflating an airbag with a proper volume of gas and for preventing leakage.

A further object of the present invention is to provide a novel structure for a diffusor cup which results in less deflection in the diffusor cup than prior art diffusor cup designs, therefore substantially reducing the gas leakage from the airbag system.

Yet another object of the present invention is to provide a novel structure for an inflator device which allows for the provision of a smaller bottle of stored gas.

Still another object of the present invention is to provide an inflator device which has greater and more consistent load carrying capability versus the prior art inflator devices.

A still further object of the present invention to provide a novel diffusor cup design for an inflator device that offers a secured mechanical connection if accidentally dropped during handling.

Briefly, and in accordance with the foregoing, the present invention provides a novel diffusor cup which forms part of a hybrid or fluid fuel inflator device which is used to inflate an airbag in a vehicle airbag restraint system. The novel structure of the diffusor cup substantially reduces the deflection thereof during deployment of the airbag. This improves the consistency and reliability of inflating the airbag with a proper volume of gas and prevents leakage.

The diffusor cup is attached to a bottle which houses a pressurized gas and the bottle and diffusor cup are mounted within a housing module identical in construction to that of the prior art. The diffusor cup is formed from a first wall which bears against an end plate of the housing module, a second wall which depends from the first wall and joins with the bottle, and a third wall which depends from the opposite end of the first wall. The second wall is formed from a truncated cone such that it tapers from the first wall to the bottle. A stud is mounted within the diffusor cup walls and is mechanically secured thereto by a plurality of annular graduated steps formed on the stud. A threaded portion of the stud secures the diffusor cup to the end plate by a nut.

In a first embodiment, the annular graduated steps on the stud engage into the second wall of the diffusor cup when the nut is threaded onto the threaded end portion of the stud as a result of the stud being drawn toward the nut. In a second, preferred embodiment, the annular graduated steps on the stud are engaged into the second wall of the diffusor cup during a sub-assembly operation wherein a back shearing operation is employed using a punch press and stationary die to drive the components together. Due to the engagement of the annular graduated steps on the stud with the second wall of the diffusor cup when internal pressures from the expansion of the gas from the bottle are applied to the stud, the stud transfers the load formed by the internal pressures to the second wall, thereby preventing substantial deflection or distortion of the diffusor cup.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a prior art inflator device which is used to inflate an airbag in an airbag system, such inflator device being housed within a housing module which is shown partially and in cross-section and being shown in an undeployed condition;

FIG. 2 is a side elevational view of the prior art inflator device shown in FIG. 1 in a deployed condition;

FIG. 3 is a perspective view of a novel inflator device, shown partially in phantom lines, which incorporates the features of the invention and which is shown as part of an airbag system, such airbag system further including a housing module for housing the inflator device, shown partially broken away, an airbag attached to the housing module and shown in phantom lines in an undeployed condition, such airbag being housed within a dashboard of an automobile, shown in phantom lines;

DETAILED DESCRIPTION OF THE PREFERRED EMBODIMENTS

Figure 4:
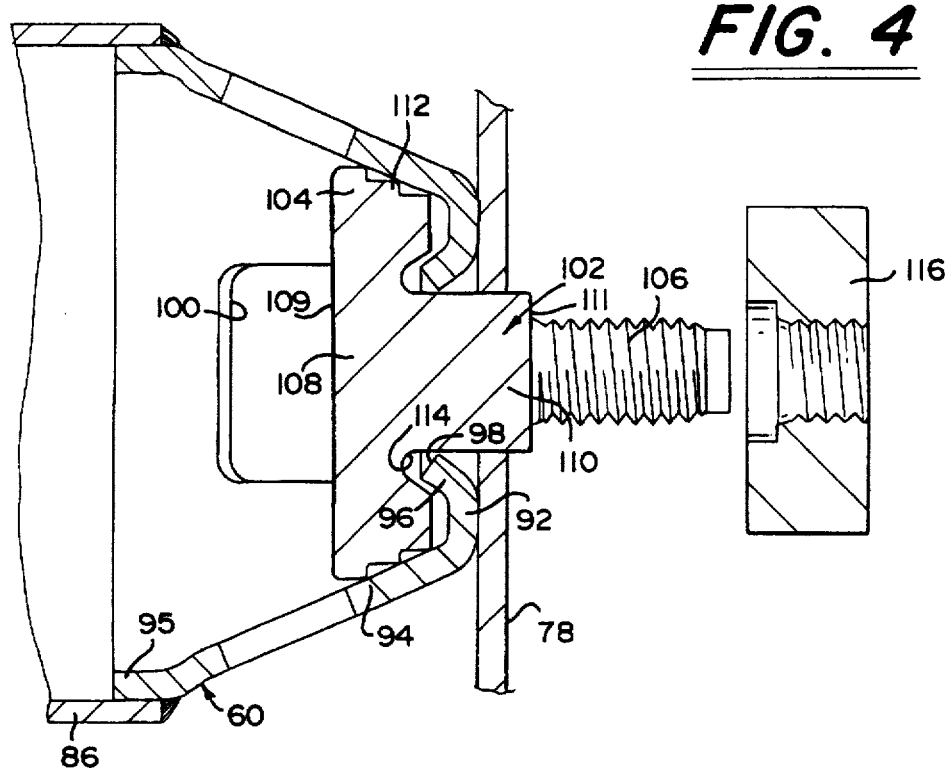
FIG. 4 is a partial, cross-sectional view of the inflator device shown in FIG. 3, partially assembled with the housing module in accordance with a first embodiment of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel diffusor cup 60 which forms part of a hybrid or fluid fuel inflator device 62 for use in inflating an airbag 64 in a vehicle airbag restraint system. The novel diffusor cup 60 prevents excess distortion and deflection thereof, and therefore leakage, during deployment of the airbag 64 so that the airbag 64 is provided with the correct volume of gas from the inflator device 62 such that the airbag 64 is fully and properly inflated. This improves the consistency and reliability of inflating the airbag 64 with a proper volume of gas. The diffusor cup 60 also overcomes the difficulties associated with handling sensitive pyrotechnic materials, such as sodium azide.

The airbag system used with the present invention includes crash detectors, i.e. accelerometers, a crash algorithm, a diagnostic circuit for monitoring system readiness, backup power electronics, a gas generator, the hybrid or fluid fuel inflator device 62, as described herein, the airbag 64, and a housing module 66 in which the inflator device 62 is enclosed and to which the airbag 64 is attached. The airbag 64, housing module 66 and inflator device 62 are housed within the dashboard 68 or the steering wheel of the vehicle with the airbag 64 directly behind a cover 70 and with the inflator device 62 mounted behind the airbag 64.

The cover 70 is severed from the remainder of the dashboard 68 or steering wheel when the airbag 64 is deployed.

Figure 6:
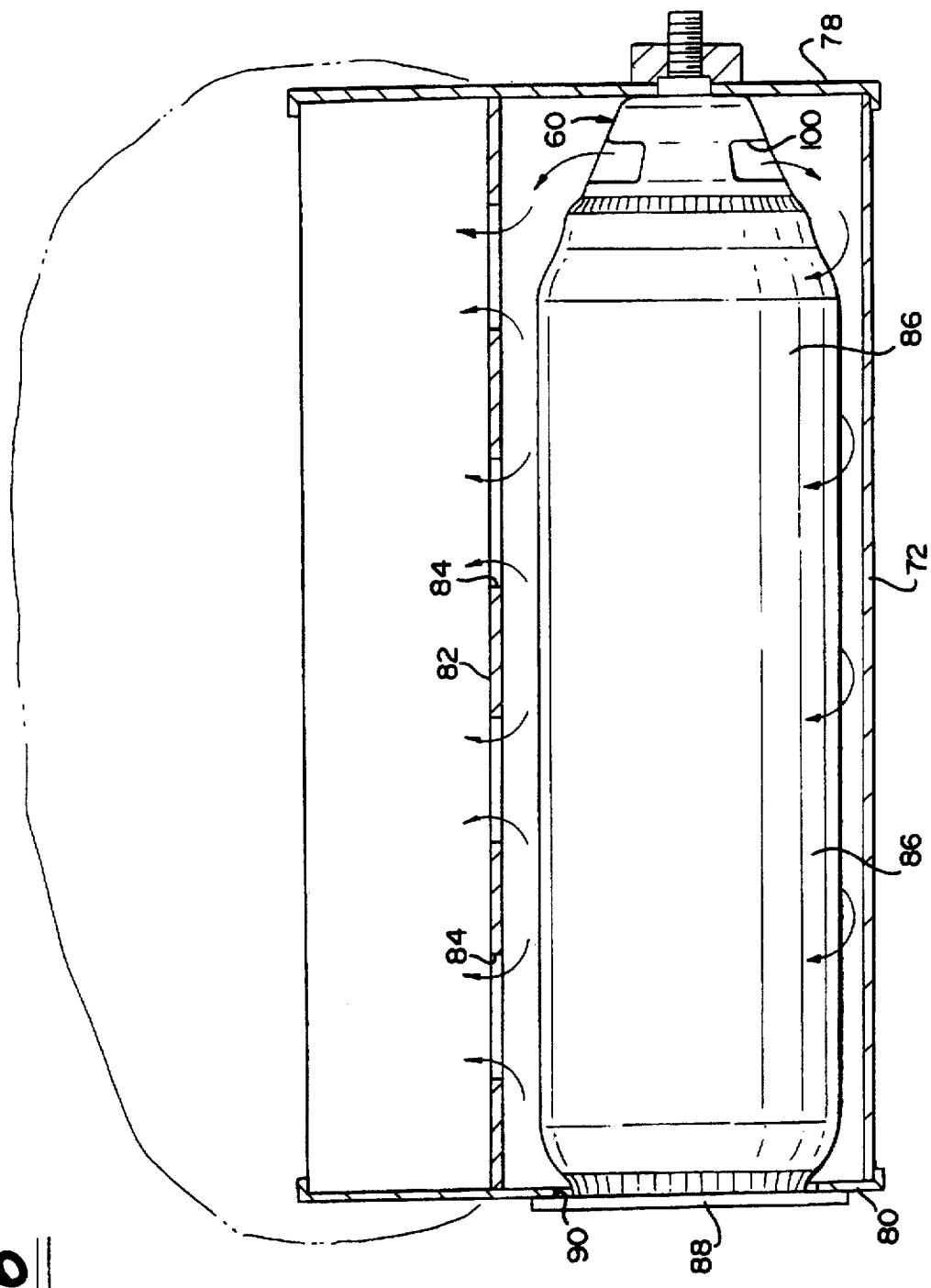
FIG. 6 is a side elevational view of the inflator device shown in FIG. 3, with the airbag shown in a partially deployed condition and in phantom lines.

The diffusor housing module 66 is identical in construction to that of the prior art shown in FIGS. 1 and 2. As shown in FIG. 6, the housing module 66 includes a back wall 72 and a pair of side walls 74, 76 which extend from the opposite side edges of the back wall 72 and are perpendicular thereto. A pair of end plates 78, 80 are attached to the opposite ends of the back wall 72 and the side walls 74, 76. A diffusor housing 82 is attached between the side walls 74, 76 and the end plates 78, 80 along the lengths thereof such that the side walls 74, 76 and the end plates 78, 80 extend beyond the diffusor housing 82 and provide a compartment for the airbag 64. The diffusor housing 82 has a plurality of exhaust ports 84 provided therethrough.

The airbag 64 is identical in construction to that of the prior art. The airbag 64 is attached to the diffusor housing 82 by suitable means such that it is in fluid communication with the interior of the housing module 66. When in an undeployed condition, the airbag 64 is folded up and stored behind the steering wheel or dashboard cover 70.

The inflator device 62 is formed from a bottle 86 having the novel diffusor cup 60 of the present invention welded to one end thereof. The bottle 86 is identical in construction to that of the prior art shown in FIGS. 1 and 2, and is formed from a cylindrical wall having an end plug 88 welded to the end thereof that is opposite to that which the diffusor cup 60. A small amount of a pyrotechnic material and a pressurized gas are stored in the bottle 86 and are activated when necessary to inflate the airbag 64.

Figure 5:
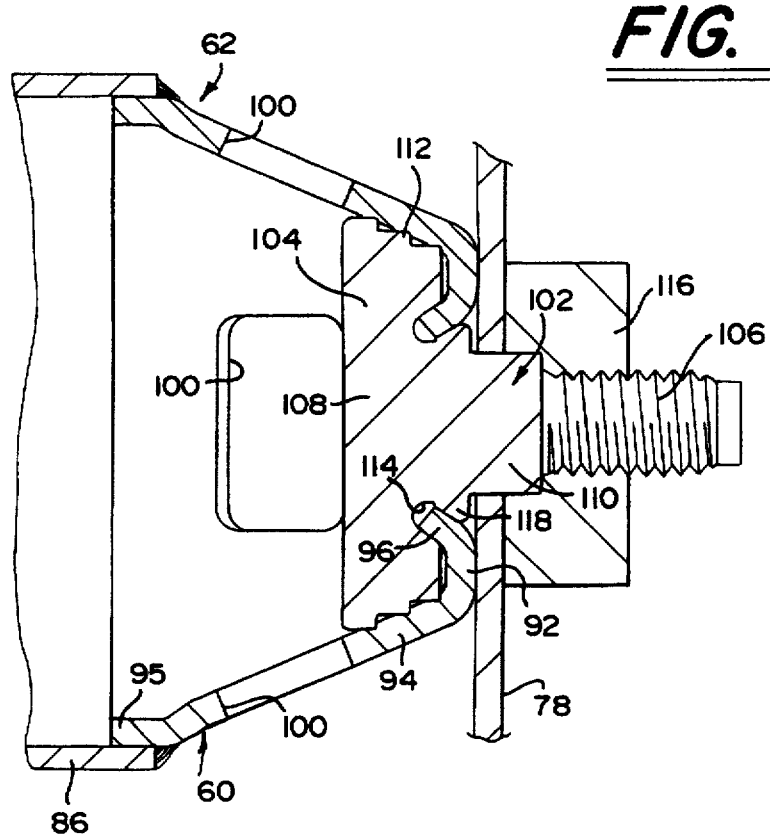
FIG. 5 is a partial, cross-sectional view of the inflator device shown in FIG. 3, fully assembled with the housing module in accordance with the first embodiment of the invention.

The diffusor cup 60 is attached to one end plate 78 of the housing module 66 as described herein and as best shown in FIG. 5. As best illustrated in FIG. 6, the end of the bottle 86 opposite to that of the diffusor cup 60 extends through an aperture 90 provided through the end plate 80 and the end plug 88 sits snugly against the outer surface of the end plate 80.

The diffusor cup 60 is formed from a first wall 92 which bears against the interior of the end plate 78, a second wall 94 which depends from the first wall 92 and joins with the end of the cylindrical wall of the bottle 86, and a third wall 96 which depends from the opposite end of the first wall 92 and defines an aperture 98 through the one end of the diffusor cup 60. The first wall 92 has a diameter which is smaller than the diameter of the bottle 86. The second wall 94 is generally formed from a truncated cone such that the second wall 94 tapers from the first wall 92 to the bottle 86 and has a portion 95 to which the bottle 86 is attached. A plurality of exhaust ports 100 are provided through the second wall 94 which allows the pressurized gas to be released from the bottle 86 and into the airbag 64 so as to inflate the airbag 64 during deployment. The tapered second wall 94 provides greater stiffness versus the prior art straight walled diffusor cup.

The diffusor cup 60 also includes a stud 102, formed of a metal material or other suitable materials, mounted within the walls 92, 94, 96 and which is mechanically secured thereto. The stud 102 is formed from a head portion 104 and a threaded portion 106 which extends therefrom and is used to secure the diffusor cup 60 to the end plate 78.

The head portion 104 includes first and second sections 108, 110 which are integrally formed with each other and which define first and second ends 109, 111 of the head portion 104. The first section 108 is generally shaped as a truncated cone and generally conforms in shape to the truncated cone profile of the second wall 94. The outer surface of the first section 108 has a plurality of annular graduated steps or teeth 112 thereon. A groove 114 is provided in the first section 108 around the second section 110. The threaded portion 106 of the stud 102 extends from the second section 110.

In a first embodiment of assembling the stud 102 with the diffusor cup 60 as shown in FIGS. 4 and 5, prior to final engagement of the diffusor cup 60 with the housing module 66, as shown in FIG. 4, the stud 102 is engaged with the diffusor cup walls 92, 94, 96. In addition, prior to final engagement of the diffusor cup 60 with the housing module 66, as shown in FIG. 4, the second section 110 of the stud 102 is shaped generally as a cylinder. The cylindrically-shaped second section 110 extends through the aperture 98 defined by the third wall 96 and through an aperture provided through the end plate 78 such that a portion of the second section 110 and the threaded portion 106 of the stud 102 extend outwardly from the end plate 78.

To finally assemble the inflator device 62 with the housing module 66 in accordance with the first embodiment of the invention, a nut 116 is threaded onto the threaded portion 106 of the stud 102. As the nut 116 is tightened against the end plate 78, the stud 102 is drawn toward the nut 116, thereby causing the annular graduated steps or teeth 112 on the head portion 104 to engage or "bite" into the interior surface of the second wall 94 and embed into the second wall 94. This mechanically secures the stud 102 to the second wall 94 of the diffusor cup 60 by a back shearing operation. The annular graduated steps 112 increase their embedment or "bite" into the second wall 94 with increasing load provided by the rotation of the nut 116. In addition, as the nut 116 is rotated into engagement with the threaded portion 106, the third wall 96 of the diffusor cup 60 deforms a portion 118 of the second section 110 to further mechanically lock the stud 102 to the walls 92, 94, 96 and to form a friction fit.

Figure 7:
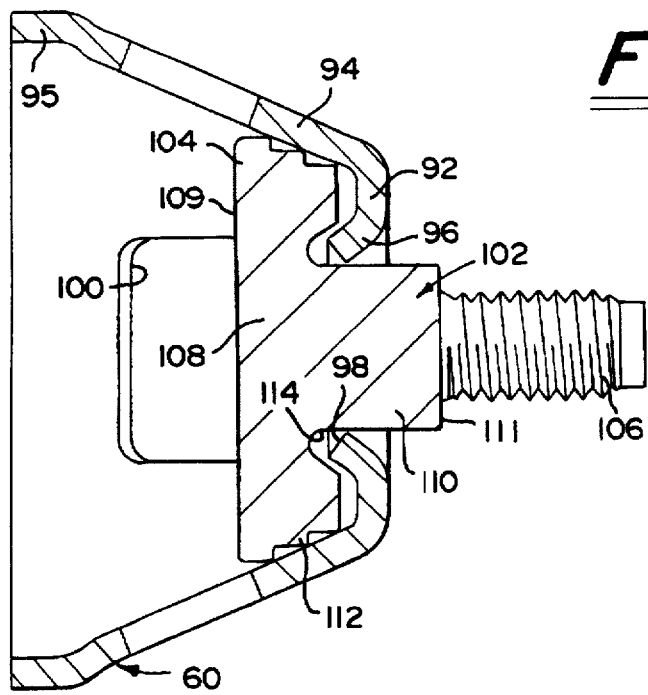
FIG. 7 is a partial, cross-sectional view of the inflator device shown in FIG. 3 before a back shearing preassembly operation.

A second, preferred method or embodiment of assembling the stud 102 with the diffusor cup 60 is shown in FIGS. 7–10. As shown in FIG. 7, the stud 102 is first positioned within the diffusor cup 60 without the attachment of the bottle 86 to the portion 95 of the third wall 94.

Figure 8:
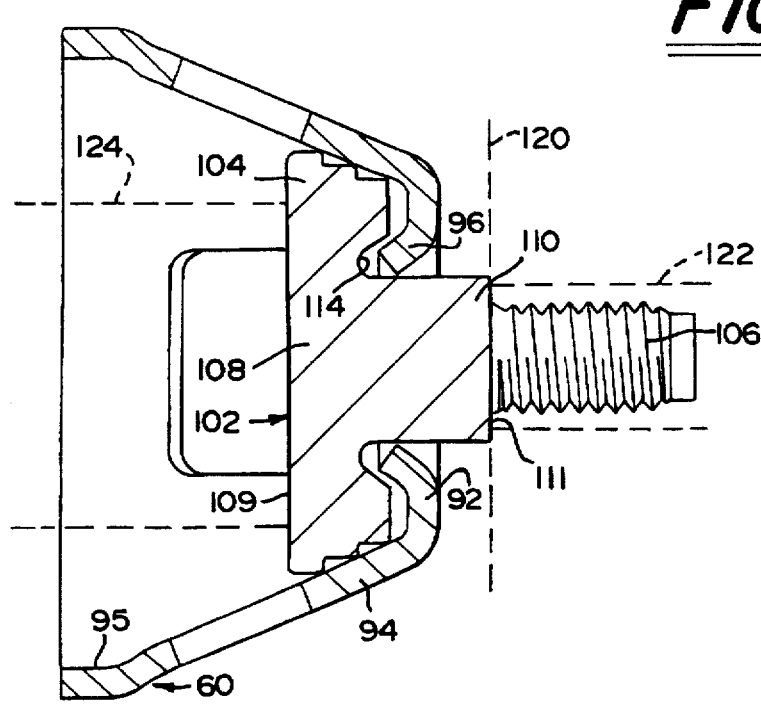
FIGS. 8 and 9 are partial, cross-sectional views of the inflator device shown in FIG. 7 and showing initial and final positions of a punch press and a stationary die which are used to pre-assemble the stud to the diffusor cup in accordance with a second, preferred embodiment of the invention.
Figure 9:
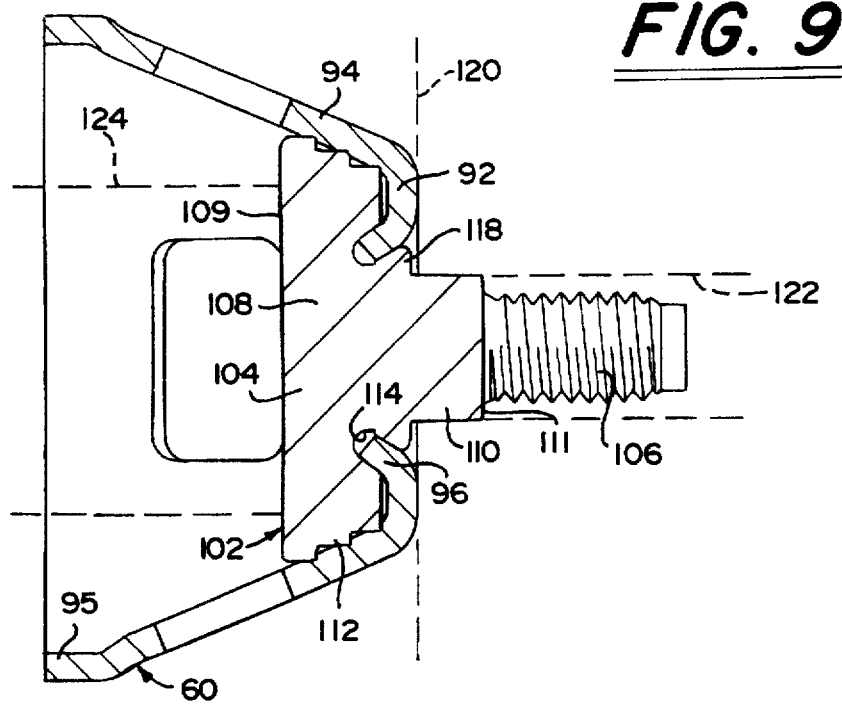

Thereafter, as shown in FIG. 8, a stationary die set 120, 124 is engaged against the second end 111 of the stud second section 110 which protrudes outwardly from the diffusor cup 60. The stationary die 120 has an aperture 122 therein in which the threaded end 106 of the stud 102 is positioned. The diameter of the aperture 122 is slightly less than the diameter of the second section 110 of the stud head portion 104. As will be explained, this provides for back shearing operation to form the shoulder portion 118, to be discussed. A punch press 124 is engaged against the first end 109 of the head portion 104. Thereafter, the punch press 124 is activated. This causes the stud 104 and the diffusor cup 60 to move toward the stationary die 120. As the components 104, 60 move toward the die 120, because of the interference between the stationary die 120 and the second section 110 of the stud head portion 104, a portion of the second section 110 is back sheared and flows toward the third wall 96 of the diffusor cup 60. This back shearing and flow continues until the first wall 92 of the diffusor cup 60 is engaged against the die 120. During this operation, the annular graduated steps 112 on the stud 102 are being embedded or "bite" into the second wall 94 of the diffusor cup 60. In the maximum engagement position of the punch press 124, as shown in FIG. 9, the first wall 92 sits against the stationary die 120.

The shoulder portion 118 has flowed against the third wall 96 forcing the third wall 96 into the groove 114 and locking the diffusor cup 60 to the stud 102 by means of the back shear and a mechanical interlock. The annular graduated steps 112 are embedded into the second wall 94 of the diffusor cup 60 to lock the diffusor cup 60 to the stud 102.

Thereafter, the punch press 124 is backed off and the assembled stud 102 and diffusor cup 60 are removed from engagement with the stationary die 120. The bottle 86 is then attached, as by welding, to the portion 95 of the second wall 94.

Figure 10:
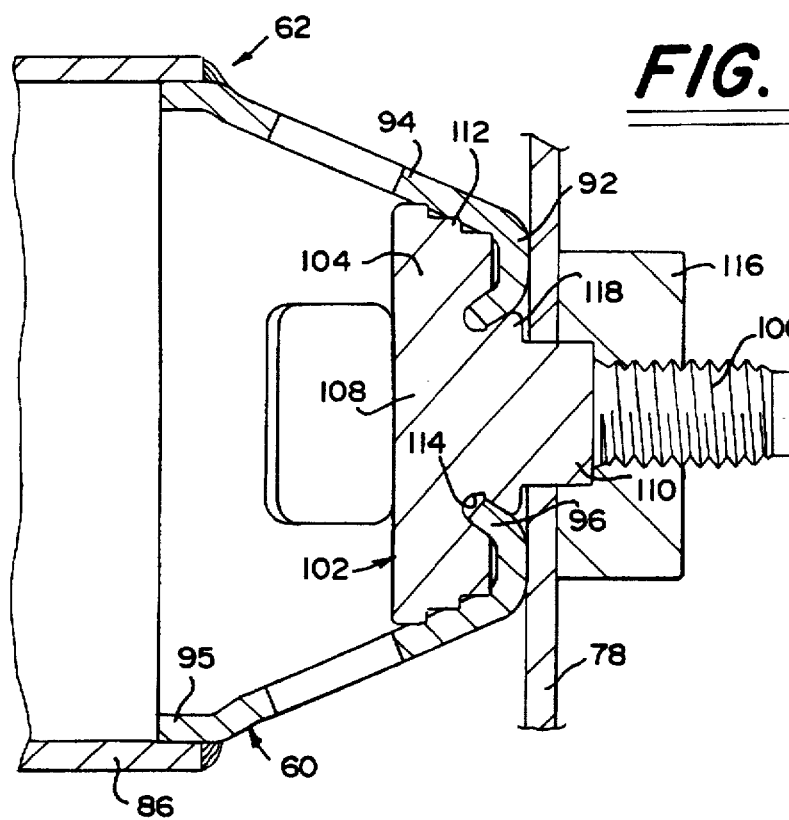
FIG. 10 is a partial, cross-sectional view of the inflator device shown in FIG. 7, after pre-assembly as shown in FIGS. 8 and 9 and fully assembled with the housing module in accordance with the second, preferred embodiment of the invention.

Next, the assembled inflator device 62 is assembled with the housing module 66 as shown in FIG. 10. The first section 110 of the stud 102 is inserted through the aperture in the end plate 78 until the first wall 92 abuts against the end plate 78. Thereafter, the nut 116 is threaded onto the threaded portion 106 of the stud 102 until it is tightened against the end plate 78. As seen from a comparison of FIGS. 5 and 10, the end result is the same.

During deployment of the airbag 64, the crash detectors send an electrical signal to the diagnostic circuit which, in turn, sends a signal to the inflator device 62. The inflator device 62 then ignites the pyrotechnic material and releases the stored, pressurized gas within the bottle 86 thereby inflating the airbag 64 as shown in FIG. 6. The gas flows out of the exhaust ports 100 in the diffusor cup 60, and through the exhaust ports 84 in the diffusor housing 82. Once a sufficient volume of gas has built up in the housing module 66, the gas flows around the bottle 86 to the exhaust ports 84. The flow rate of the gas is controlled by the exhaust ports 84, 100 in the diffusor housing 82 and in the diffusor cup 60. When these internal pressures from the released gas are applied to the stud 102, the load formed by the internal pressures is transferred to the tapered second wall 94 of the diffusor cup 60 rather than to the first wall 92 of the diffusor cup 60 which bears against the interior of the end plate 78, thereby minimizing the amount of deflection of the diffusor cup 60. As a result, the end plug 88 attached to the bottle 86 does not move a substantial amount away from the end plate 80 that would cause a significant leak path as occurs in the prior art. Therefore, because of the diffusor cup 60 of the present invention deflected to a substantially lesser amount than the prior art design, the gas leakage through the end plug 88 to the end plate 80 connection is substantially reduced. This ensures that the airbag 64 will be inflated to a greater extent, thereby increasing reliability and allowing for the potential of a smaller bottle of stored gas.

It has been found from testing that the amount of deflection of the diffusor cup 60 of the present invention is substantially reduced versus the prior art design. Specifically, it has been found that the amount of deflection of the diffusor cup 60 is one-third of the deflection of the prior art design.

Also, it has been found from testing that the ultimate load carrying capabilities of the diffusor cup 60 is higher than the prior art design. A greater and more consistent load carrying capability is provided versus the prior art design.

During testing, a simulation of the forces which occur during deployment of the airbag were employed by using an external tensile load to simulate the internal pressures from expansion of the gas. The test results for the diffusor cup 60 and mechanically interconnected stud 102 of the present invention versus the prior art diffusor cup and welded stud are as follows: t.200

Furthermore, because the stud 102 is not welded to the walls of the diffusor cup 60, as is provided in the prior art, and is instead held by the mechanical interconnection of the stud 102 with the walls 92, 94, 96, more consistent mechanical properties of the stud 102 are achieved. This allows for the use of a heat treated diffusor cup 60, if desired, and for the use of dissimilar materials. Therefore, a potential for weight savings is achieved.

The mechanical interconnection of the stud 102 with the walls 92, 94, 96 further provides a secured mechanical connection if the inflator device 62 is accidentally dropped during handling. It has been found during testing that the diffusor cup 60 of the present invention will withstand a drop test with a four pound weight attached to the diffusor cup 60 from four feet.

While preferred embodiments of the present invention are shown and described, it is envisioned that those skilled in the art may devise various modifications of the present invention without departing from the spirit and scope of the appended claims.

The invention claimed is:

1. A diffusor cup for use with an inflator device in an airbag system, the inflator device preferably having a bottle housing a gas attached to said diffusor cup, said inflator device being enclosed within a housing module having opposite end plates, said diffusor cup comprising:

a first wall for bearing against one of the end plates of the housing module, a second wall which depends from said first wall and joins with the bottle, said second wall being formed from a truncated cone such that said second wall tapers from said first wall to the bottle; and a stud mounted within said first and second walls, said stud being mechanically secured to said first and second walls and having structure thereon capable of securing said stud to the end plate.

2. A diffusor cup as defined in claim 1, wherein said stud includes a head portion and a threaded portion extending therefrom, an outer surface of said head portion having a plurality of steps thereon which are engaged into said second wall, said threaded portion extending through said first wall and through the end plate to which the diffusor cup is attached, whereby when a load is applied to said stud, said stud transfers the load to said second wall.

3. A diffusor cup as defined in claim 2, wherein said head portion of said stud further includes a first section on which said steps are provided and a second section extending from said first section, said threaded portion extending from said second section.

4. A diffusor cup as defined in claim 3, further including a third wall connected to the opposite end of said first wall, said third wall defining an aperture through which said second section and said threaded portion attached thereto extend, said stud having means provided thereon for securing said third wall to said stud.

5. A diffusor cup as defined in claim 1, further including a plurality of exhaust ports provided through said second wall, said exhaust ports allowing pressurized gas provided in the bottle to escape.

6. An inflator device for use in inflating an airbag, said inflator device being enclosed within a housing module having opposite end plates, said inflator device comprising:

a bottle for housing a pressurized gas;

a diffusor cup attached to said bottle, said diffusor cup comprising a first wall for bearing against one of the end plates of the housing module, a second wall which depends from said first wall and joins with the bottle, said second wall being formed from a truncated cone such that said second wall tapers from said first wall to the bottle; and a stud mounted within said first and second walls, said stud being mechanically secured to said first and second walls and having structure thereon capable of securing said stud to the end plate; and means for securing said stud to the end plate.

7. An inflator device as defined in claim 6, wherein said stud includes a head portion and a threaded portion extending therefrom, an outer surface of said head portion having a plurality of steps thereon which are engaged into said second wall, said threaded portion extending through said first wall and through the end plate of the housing module to which the diffusor cup is attached, whereby when a load is applied to said stud, said stud transfers the load to said second wall.

8. An inflator device as defined in claim 7, wherein said securing means comprises a nut, said nut being threaded onto said threaded portion.

9. An inflator device as defined in claim 7, wherein said head portion of said stud further includes a first section on which said steps are provided and a second section extending from said first section, said threaded portion extending from said second section and being secured to the end plate by said securing means.

10. An inflator device as defined in claim 9, further including a third wall connected to the opposite end of said first wall, said third wall defining an aperture through which said second section and said threaded portion attached thereto extend, said stud having means provided thereon for securing said third wall to said stud.

11. An inflator device as defined in claim 6, further including a plurality of exhaust ports provided through said second wall, said exhaust ports allowing said pressurized gas provided in said bottle to escape.

12. An airbag system comprising:

an airbag;

an inflator device associated with said airbag for inflating said airbag by releasing pressured gas therefrom;

a housing module attached to said airbag and enclosing said inflator device therein, said housing module including opposite end plates and structure between said end plates for allowing fluid communication between said airbag and said inflator device;

said inflator device comprising a bottle for housing a pressurized gas; a diffusor cup attached to said bottle, said diffusor cup comprising a first wall for bearing against one of the end plates of the housing module, a second wall which depends from said first wall and joins with the bottle, said second wall being formed from a truncated cone such that said second wall tapers from said first wall to the bottle; and a stud mounted within said first and second walls, said stud being mechanically secured to said first and second walls and having structure thereon capable of securing said stud to the end plate; and means for securing said stud to the end plate.

13. An airbag system as defined in claim 12, wherein said stud of said diffusor cup includes a head portion and a threaded portion extending therefrom, an outer surface of said head portion having a plurality of steps thereon which are engaged into said second wall, said threaded portion extending through said first wall and through said end plate of said housing module to which said diffusor cup is attached, whereby when a load is applied to said stud, said stud transfers the load to said second wall.

14. An airbag system as defined in claim 13, wherein said securing means comprises a nut, said nut being threaded onto said threaded portion.

15. An airbag system as defined in claim 13, wherein said head portion of said stud further includes a first section on which said steps are provided and a second section extending from said first section, said threaded portion extending from said second section and being secured to said end plate by said securing means.

16. An airbag system as defined in claim 15, further including a third wall connected to the opposite end of said first wall, said third wall defining an aperture through which said second section and said threaded portion attached thereto extend, said stud having means provided thereon for securing said third wall to said stud to further mechanically lock said stud to said first and second walls.

17. An airbag system as defined in claim 12, further including a plurality of exhaust ports provided through said second wall, said exhaust ports allowing said pressurized gas provided in said bottle to escape.

18. An airbag system as defined in claim 12, wherein said structure between said end plates for allowing fluid communication between said airbag and said inflator device is a diffusor housing having a plurality of exhaust ports provided therethrough, said exhaust ports allowing said pressurized gas provided in said bottle to pass through said diffusor housing.

* * * * *

UNITED STATES PATENT AND TRADEMARK OFFICE
CERTIFICATE OF CORRECTION

PATENT NO. : 5,785,348

DATED : July 28, 1998

INVENTOR(S) : Steven P. Donovan and David C. Goss

Page 1 of 2

It is certified that error appears in the above-identified patent and that said Letters Patent is hereby corrected as shown below:

Column 7, Line 63 "t,200" should be deleted

Column 7, Line 63 the following table should be inserted:

Signed and Sealed this

Twenty-ninth Day of June, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,785,348

DATED : July 28, 1998

INVENTOR(S) : Steven P. Donovan and David C. Goss

It is certified that error appears in the above-identified patent and that said Letters Patent is hereby corrected as shown below:

|  | Deflection (in) @ 6000 lbs. tensile load (lbs.) | Ultimate tensile load (lbs.) | Failure Mode |
| --- | --- | --- | --- |
| Mechanically interconnected diffusor cup and stud | 0.056" | 8283 | Tensile failure stud |
| Weld-stud, Prior Art diffusor cup and welded stud | 0.175" | 6500 | Weld failure |